(12) United States Patent
Kim et al.

(10) Patent No.: US 10,291,074 B2
(45) Date of Patent: May 14, 2019

(54) METHOD AND APPARATUS FOR TRANSMITTING WIRELESS POWER

(71) Applicant: Samsung Electronics Co., Ltd., Suwon-si, Gyeonggi-do (KR)

(72) Inventors: Bong-Chul Kim, Seoul (KR); Do-Won Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 15/258,502

(22) Filed: Sep. 7, 2016

(65) Prior Publication Data
US 2017/0070101 A1    Mar. 9, 2017

(30) Foreign Application Priority Data

Sep. 9, 2015  (KR) .................. 10-2015-0127849
Jun. 24, 2016 (KR) .................. 10-2016-0079566

(51) Int. Cl.
 *H02J 7/02* (2016.01)
 *H02J 50/10* (2016.01)
 *H02J 50/12* (2016.01)
 *H02J 50/80* (2016.01)

(52) U.S. Cl.
 CPC ............... *H02J 50/12* (2016.02); *H02J 50/10* (2016.02); *H02J 50/80* (2016.02); *H02J 7/025* (2013.01)

(58) Field of Classification Search
 CPC .. H02J 50/12; H02J 7/025; H02J 50/10; H02J 50/80; G05B 13/0205
 See application file for complete search history.

(56) References Cited

U.S. PATENT DOCUMENTS

| | | | |
|---|---|---|---|
| 2012/0104867 A1 | 5/2012 | Mudrick et al. | |
| 2012/0235509 A1 | 9/2012 | Veno et al. | |
| 2012/0313447 A1 | 12/2012 | Park et al. | |
| 2015/0077048 A1* | 3/2015 | Bae | H02J 7/025 320/108 |
| 2016/0118805 A1* | 4/2016 | Swope | H02J 50/12 307/104 |
| 2016/0226296 A1* | 8/2016 | Bae | H02J 5/00 |
| 2016/0352134 A1* | 12/2016 | Pawar | H02J 7/025 |

FOREIGN PATENT DOCUMENTS

| | | |
|---|---|---|
| JP | 2014-217120 A | 11/2014 |
| KR | 10-2012-0135885 A | 12/2012 |
| KR | 10-2014-0060186 A | 5/2014 |
| KR | 10-2014-0070705 A | 6/2014 |
| KR | 10-2014-0080549 A | 6/2014 |
| WO | 2015-007696 A1 | 1/2015 |
| WO | 2015-087328 A1 | 6/2015 |

* cited by examiner

*Primary Examiner* — Jared Fureman
*Assistant Examiner* — Duc M Pham
(74) *Attorney, Agent, or Firm* — Jefferson IP Law, LLP

(57) ABSTRACT

A method and an apparatus for wirelessly transmitting power are provided. The method includes transmitting power of a first level determined based on a maximum load power level of a load, which is electrically connected to a wireless power receiver, to the wireless power receiver, receiving information on a used load power level according to a load change in the load from the wireless power receiver, and controlling a power level transmitted to the wireless power receiver according to the information on the received used load power level.

29 Claims, 10 Drawing Sheets

METHOD AND APPARATUS FOR TRANSMITTING WIRELESS POWER

CROSS-REFERENCE TO RELATED APPLICATION(S)

This application claims the benefit under 35 U.S.C. § 119(a) of a Korean patent application filed on Sep. 9, 2015 in the Korean Intellectual Property Office and assigned Serial number 10-2015-0127849, and of a Korean patent application filed on Jun. 24, 2016 in the Korean Intellectual Property Office and assigned Serial number 10-2016-0079566, the entire disclosure of which is hereby incorporated by reference.

TECHNICAL FIELD

The present disclosure relates to a method and an apparatus for transmitting wireless power.

BACKGROUND

Mobile terminals such as mobile phones, personal digital assistants (PDAs) and the like, are driven by rechargeable batteries due to their nature, and the battery of such mobile terminals is charged through supplied electronic energy by using a separate charging apparatus. Typically, the charging device and the battery have separate contact terminals at an exterior thereof, respectively, and are electrically connected with each other by contacting the contact terminals.

However, in such a contact-type charging scheme, the contact terminals protrude outwardly, and thus are easily contaminated by foreign substances. As a result, battery charging is not correctly performed. Further, the battery charging may not be correctly performed when the contact terminal is exposed to moisture.

Recently, a wireless charging or non-contact charging technology has been developed and used for electronic devices to solve the above-mentioned problems.

The wireless charging technology uses wireless power transmission and reception, and corresponds to, for example, a system in which a battery is automatically charged if the battery is simply placed on a charging pad, without connecting the mobile phone to a separate charging connector. Such wireless charging technology is generally known to people through association with wireless electrical toothbrushes or wireless electric shavers. The wireless charging technology can improve a waterproofing function because it can be used to wirelessly charge the electronic devices. The wireless charging technology can also improve the portability of the electronic devices because it does not require a wired charger. Therefore, it is expected that technologies related to wireless charging will significantly develop in the coming age of electric cars.

The wireless charging technology largely includes an electromagnetic induction scheme using a coil, a resonance scheme using a resonance, and a radio frequency (RF)/microwave radiation scheme converting electrical energy to microwave radiation, and then transmitting the microwave radiation.

Currently, the electromagnetic induction scheme is considered the mainstream technology, but it is expected that soon all electronic products will be wirelessly charged, anytime and anywhere, without a wire through the use of microwaves at home and abroad, based on the strength of recent successful experiments for wirelessly transmitting power to destinations separated by dozens of meters.

A power transmission method through electromagnetic induction corresponds to a scheme of transmitting electric power between a first coil and a second coil. When a magnetic is moved in a coil, an induction current occurs. By using the induction current, a magnetic field is generated at a transmitting end, and an electric current is induced according to a change in the magnetic field so as to generate energy at a receiving end. The phenomenon is referred to as magnetic induction, and the power transmission method using magnetic induction has a high energy transmission efficiency.

With respect to the resonance scheme, in 2005, Prof. Soljacic of The Massachusetts Institute of Technology (MIT) announced a system in which electricity is wirelessly transferred using an electric power transmission principle of resonance based on a coupled mode theory, even if a device to be charged is separated from a charging device by several meters. The MIT research team made an electromagnetic wave containing electrical energy resonating instead of making sounds resonating. It is known that resonant electrical energy does not affect surrounding machines or human bodies, differently from other electromagnetic waves, because the resonant electrical energy is directly transferred only to a device having a resonance frequency and unused parts are reabsorbed into an electromagnetic field instead of spreading into the air.

In order to make a television (TV), monitor, or home appliance wireless by removing a power line therefrom, a battery and wireless power transmission may be considered. Although battery technology has been improved, battery life may still be limited by the number of times by which the battery is charged and discharged. Therefore, a need exists to provide power through wireless power transmission without the aid of a battery.

The wireless power transmission of the related art is still based on a battery environment in which a load is determined by a charging current of a battery, and is controlled based on the charging current of a battery. However, since the wireless power transmission has a wider load change range and varies within a short time compared to the load by the charging current of a battery, it is difficult to perform the wireless power transmission through the schemes of the related art.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a method and an apparatus for wirelessly transmitting power, which can stably transmit wireless power while maintaining a high efficiency without additional circuits in a condition under which a load change width is wide and rapidly varies. The method and apparatus may do so by configuring a range of a wireless power level at which a load change can be handled and transmitting only as much wireless power as the load used.

In accordance with an aspect of the present disclosure, a method of wirelessly transmitting power by a wireless power transmitter is provided. The method includes transmitting power of a first level determined based on a maximum load power level of a load, which is electrically connected to a wireless power receiver, to the wireless power receiver, receiving information on a used load power level according to a load change in the load from the wireless power receiver, and controlling a power level transmitted to the wireless power receiver according to the information on the received used load power level.

In accordance with another aspect of the present disclosure, a method of wirelessly receiving power by a wireless power receiver is provided. The method includes receiving power of a first level determined based on a maximum load power level of a load, which is electrically connected to the wireless power receiver, from a wireless power transmitter, acquiring information on a used load power level according to a load change in the load, which is electrically connected to the wireless power receiver, transmitting the acquired information on the used load power level to the wireless power transmitter, and receiving power of a power level controlled in accordance with the information on the used load power level from the wireless power transmitter.

In accordance with another aspect of the present disclosure, a wireless power transmitter is provided. The wireless power transmitter includes a communication unit that receives information on a maximum load power level of a load electrically connected to a wireless power receiver, and information on a used load power level according to a load change in the load, a controller that transmits power of a first level determined based on the maximum load power level to the wireless power receiver, receives information on the used load power level according to a load change in the load from the wireless power receiver, and controls a power level transmitted to the wireless power receiver according to the received information on the used load power level, and a wireless power transmitting unit that transmits wireless power to the wireless power receiver according to a control of the controller.

In accordance with another aspect of the present disclosure, a wireless power receiver is provided. The wireless power receiver includes a communication unit that transmits information on a maximum load power level of a load electrically connected to the wireless power receiver, and information on a used load power level according to a load change in the load to a wireless power transmitter, a controller that controls transmission of information on the maximum load power level and information on the used load power level to the wireless power transmitter, and a wireless power receiving unit that receives wireless power from the wireless power transmitter.

In accordance with another aspect of the present disclosure, a non-transitory computer readable recording medium for storing at least one instruction is provided. The instruction, when executed by a processor, configures the processor to transmit power of a first level determined based on a maximum load power level of a load, which is electrically connected to a wireless power receiver, to the wireless power receiver, receive information on a used load power level according to a load change in the load from the wireless power receiver, and control a power level transmitted to the wireless power receiver according to the information on the received used load power level.

In accordance with another aspect of the present disclosure, a non-transitory computer readable recording medium for storing at least one instruction is provided. The instruction, when executed by a processor, configures the processor to receive power of a first level determined based on a maximum load power level of a load, from a wireless power transmitter, acquire information on a used load power level according to a load change in the load, transmit the acquired information on the used load power level to the wireless power transmitter, and receive power of a power level controlled in accordance with the information on the used load power level from the wireless power transmitter.

According to various embodiments of the present disclosure, it is possible to stably transmit wireless power while maintaining a high efficiency without additional circuits in a condition under which a load change width is wide and rapidly varies. The various embodiments may do so by configuring a range of a wireless power level at which a load change can be handled and transmitting only as much wireless power as the load used. Accordingly, in an environment which is not a battery environment or in an environment relating to various wireless power transmission conditions such as supplying wireless power to an electronic device in real time, resource waste and efficiency loss can be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
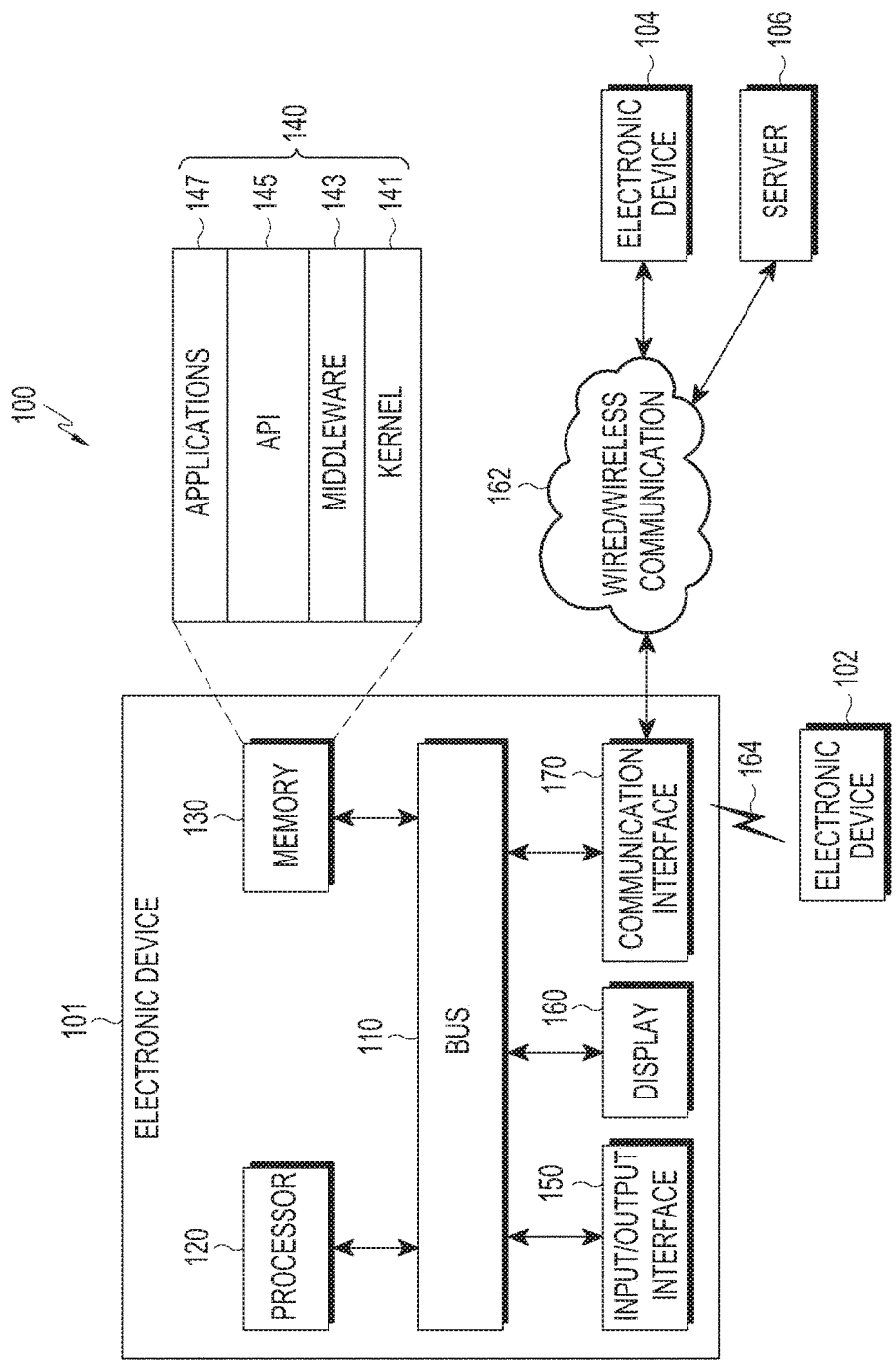
FIG. 1 is a block diagram illustrating an electronic device within a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

As used herein, the expression "have", "may have", "include", or "may include", refers to the existence of a corresponding feature (for example, numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second", used in various embodiments of the present disclosure may modify various components regardless of the order and/or importance, but does not limit the corresponding components. For example, a first user device and a second user device indicate different user devices, although both of them are user devices. As further example, a first element may be termed a second element, and similarly, a second element may be termed a first element, without departing from the scope of the present disclosure.

It should be understood that when an element (for example, first element) is referred to as being (operatively or communicatively) "connected," or "coupled," to another element (for example, second element), it may be directly connected or coupled directly to the other element, or any other element (for example, third element) may be interposed between them. In contrast, it may be understood that when an element (for example, first element) is referred to as being "directly connected," or "directly coupled" to another element (for example, second element), there are no elements (for example, third element) interposed between them.

The expression "configured to" used in the present disclosure may be exchanged with, for example, "suitable for", "having the capacity to", "designed to", "adapted to", "made to", or "capable of", according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (for example, embedded processor) for only performing the corresponding operations, or a general-purpose processor (for example, central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, tablet personal computer (PC), mobile phone, video phone, electronic book reader (e-book reader), desktop PC, laptop PC, netbook computer, workstation, server, personal digital assistant (PDA), portable multimedia player (PMP), Moving Picture Experts Group phase 1 or phase 2 (MPEG-1 or MPEG-2) audio layer-3 (MP3) player, mobile medical device, camera, and wearable device. According to various embodiments, the wearable device may include at least one of an accessory type (for example, a watch, ring, bracelet, anklet, necklace, glasses, contact lens, or head-mounted device (HMD)), a fabric or clothing integrated type (for example, electronic clothing), a body-mounted type (for example, a skin pad or tattoo), and a bio-implantable type (for example, an implantable circuit).

According to various embodiments of the present disclosure, the electronic device may be a home appliance. The home appliance may include at least one of, for example, a television (TV), digital versatile disc (DVD) player, audio player, refrigerator, air conditioner, vacuum cleaner, oven, microwave oven, washing machine, air cleaner, set-top box, home automation control panel, security control panel, TV box (for example, Samsung HomeSync™, Apple TV™, or Google TV™), game console (for example, Xbox™ and PlayStation™), electronic dictionary, electronic key, camcorder, and electronic photo frame.

According to an embodiment of the present disclosure, the electronic device may include at least one of various medical devices (for example, various portable medical measuring devices (for example, a blood glucose monitoring device, heart rate monitoring device, blood pressure measuring device, body temperature measuring device, and the like), a magnetic resonance angiography (MRA), a magnetic resonance imaging (MRI) device, a computed tomography (CT) machine, and an ultrasonic machine), a navigation device, global positioning system (GPS) receiver, event data recorder (EDR), flight data recorder (FDR), vehicle infotainment devices, electronic devices for a ship (for example, a navigation device for a ship, and a gyro-compass), avionics, security devices, an automotive head unit, a robot for home or industry, automatic teller's machine (ATM) in banks, point of sales (POS) in a shop, or Internet device of things (for example, a light bulb, various sensors, electric or gas meter, sprinkler device, fire alarm, thermostat, streetlamp, toaster, sporting goods, hot water tank, heater, boiler, and the like).

According to various embodiments of the present disclosure, the electronic device may include at least one of a part of furniture or a building/structure, an electronic board, an electronic signature receiving device, a projector, and various kinds of measuring instruments (for example, a water meter, electric meter, gas meter, and radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (for example, an artificial intelligence electronic device) that uses an electronic device.

FIG. 1 is a block diagram illustrating an electronic device within a network environment according to various embodiments of the present disclosure.

Referring to FIG. 1, an electronic device 101 within a network environment 100 includes a bus 110, a processor 120, a memory 130, an input/output interface 150, a display 160, and a communication interface 170. In various embodiments, the electronic device 101 may omit at least one of the above elements or include other elements or element combinations.

The bus 110 may include, for example, a circuit for connecting the components and transmitting communication between the elements (for example, control messages and/or data).

The processor 120 may include one or more of a CPU, an AP, and a communications processor (CP). The processor 120 may carry out, for example, operations or data processing related to control and/or communication of one or more elements of the electronic device 101.

The memory 130 may include a volatile memory and/or a non-volatile memory. The memory 130 may store, for example, instructions or data related to at least one element of the electronic device 101. According to an embodiment, the memory 130 may store software and/or a program 140. The program 140 may include a kernel 141, middleware 143, an application programming interface (API) 145, and/or application programs ("apps" or "applications") 147. At least some of the kernel 141, middleware 143, and API 145 may be referred to and operate as an operating system (OS).

The kernel 141 may control or manage system resources (for example, the bus 110, processor 120, or memory 130) used for performing an operation or function implemented by the other programs (for example, the middleware 143, API 145, or application programs 147). Furthermore, the kernel 141 may provide an interface through which the middleware 143, API 145, or application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, processor 120, memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instructions) for file control, window control, image processing, or text control.

The input/output interface 150 may function as, for example, an interface that may transfer instructions or data input from a user or another external device to the other element(s) of the electronic device 101. Also, the input/output interface 150 may output instructions or data received from other element(s) of the electronic device 101 to the user or another external device.

The display 160 may include, for example, a liquid crystal display (LCD), light-emitting diode (LED) display, organic LED (OLED) display, micro electro mechanical systems (MEMS) display, and an electronic paper display. The display 160 may display various types of contents (for example, text, images, videos, icons, or symbols) to users. The display 160 may include a touch screen and receive, for example, a touch, gesture, proximity, or hovering input by using an electronic pen or a user's body part.

The communication interface 170 may establish communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may be performed by using at least one of, for example, Wi-Fi, Bluetooth, near field communication (NFC), and global navigation satellite system (GNSS). The GNSS may include at least one of, for example, a GPS, a global navigation satellite system (GLONASS), a BeiDou navigation satellite system (hereinafter referred to as "BeiDou"), and a European global satellite-based navigation system (Galileo), according to a use area, bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard 232 (RS-232), and a plain old telephone service (POTS). The network 162 may include at least one of a communication network, for example, a computer network (for example, a local area network (LAN) or a wide area network (WAN)), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed by the electronic device 101 may be performed by another electronic device or a plurality of electronic devices (for example, the electronic device 102 or 104, or the server 106). According to an embodiment, when the electronic device 101 is to perform some functions or services automatically or by request, the electronic device 101 may make a request for performing at least some of the functions related to the functions or services to another device (for example, the electronic device 102 or 104, or the server 106) instead of performing the functions or services itself. The other electronic device (for example, the electronic device 102 or 104 or the server 106) may execute the requested functions or the additional functions, and may deliver a result of the execution to the electronic device 101. The electronic device 101 may provide the received results as received, or after additionally processing the received results and thereafter providing the requested functions or services. To achieve this, for example, cloud computing, distributed computing, or client-server computing technology may be used.

Figure 2:
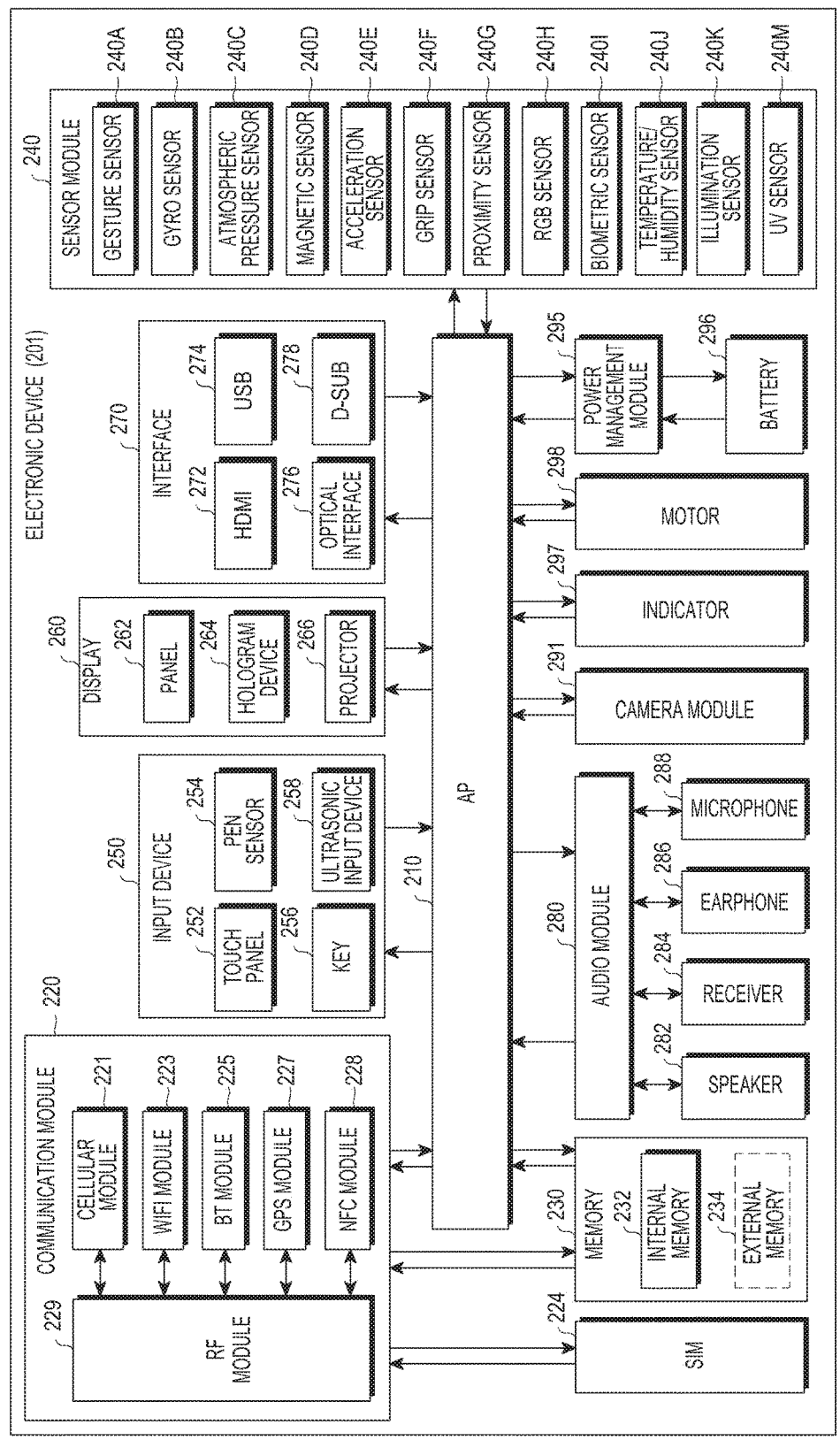
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may include, for example, all or some of the elements of electronic device 101 illustrated in FIG. 1. The electronic device 201 includes at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program, and perform processing of various pieces of data and calculations. The processor 210 may be implemented by, for example, a system on chip (SoC). According to an embodiment, the processor 210 may further include a graphics processing unit (GPU) and/or an image signal processor. The processor 210 may include at least some (for example, a cellular module 221) of the other elements illustrated in FIG. 2. The processor 210 may load, into a volatile memory, instructions or data received from at least one (for example, a non-volatile memory) of the elements illustrated in FIG. 2 and may process the loaded instructions or data, and may store various data and results in a non-volatile memory.

The communication module 220 may have a configuration equal or similar to that of the communication interface 170 of FIG. 1. The communication module 220 may include, for example, the cellular module 221, a Wi-Fi module 223, a Bluetooth module 225, a GNSS module 227, an NFC module 228, and a radio frequency (RF) module 229.

The cellular module 221 may provide a voice call, image call, text message service, or Internet service through, for example, a communication network. According to an embodiment, the cellular module 221 may identify and authenticate the electronic device 201 within a communication network using a SIM (for example, the SIM card 224). According to an embodiment of the present disclosure, the cellular module 221 may perform at least some of the functions that the processor 210 may provide. According to an embodiment of the present disclosure, the cellular module 221 may include a CP.

Each of the Wi-Fi module 223, Bluetooth module 225, GNSS module 227, and NFC module 228 may include, for example, a processor for processing data transmitted and received through the corresponding module. According to various embodiments, at least some (for example, two or more) of the cellular module 221, Wi-Fi module 223, Bluetooth module 225, GNSS module 227, and NFC module 228 may be included in one integrated chip (IC) or IC package.

The RF module 229 may transmit/receive, for example, a communication signal (for example, an RF signal). The RF module 229 may include, for example, a transceiver, power amp module (PAM), frequency filter, low noise amplifier (LNA), or antenna. According to an embodiment of the present disclosure, at least one of the cellular module 221, Wi-Fi module 223, Bluetooth module 225, GNSS module 227, and NFC module 228 may transmit and receive RF signals through a separate RF module.

The SIM 224 may include, for example, a card including a subscriber identity module and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include at least one of a volatile memory (for example, a dynamic random access memory (DRAM), static RAM (SRAM), synchronous DRAM (SDRAM), and the like) and a non-volatile memory (for example, a one time programmable read only memory (OTPROM), programmable ROM (PROM), erasable and programmable ROM (EPROM), electrically erasable and programmable ROM (EEPROM), mask ROM, flash ROM, flash memory (for example, a NAND flash memory or a NOR flash memory), hard disk drive, solid state drive (SSD), and the like).

The external memory 234 may further include a flash drive, for example, a compact flash (CF), secure digital (SD), micro-SD, mini-SD, extreme digital (xD), memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In various embodiments, the electronic device 201 may further include a processor configured to control the sensor module 240 as a part of or separately from the AP 210, and may control the sensor module 240 to remain active while the AP 210 is in a sleep state.

The input device 250 may include, for example, a touch panel 252, a (digital) pen sensor 254, a key 256, and an ultrasonic input unit 258. The touch panel 252 may use at least one of, for example, a capacitive type, resistive type, infrared type, and ultrasonic type of detection technology. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or which is separated from the touch panel. The key 256 may include, for example, a physical button, optical key or keypad. The ultrasonic input unit 258 may input data through an input means that generates an ultrasonic signal, and the electronic device 201 identify data by detecting a sound wave with a microphone (for example, a microphone 288).

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, impact-resistant or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside of the electronic device 201. According to an embodiment, the display 260 may further include a control circuit for controlling the panel 262, hologram device 264, or projector 266.

The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, an SD card/multi-media card (MMC) interface, or an infrared data association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288, or the like.

The camera module 291 is a device which may photograph a still image and a dynamic image. According to an embodiment of the present disclosure, the camera module 291 may include one or more image sensors (for example, a front sensor or a back sensor), a lens, an image signal processor (ISP) or a flash (for example, LED or xenon lamp).

The power management module 295 may manage, for example, power of the electronic device 201. According to an embodiment of the present disclosure, the power management module 295 may include a power management IC (PMIC), a charger IC, or a battery or fuel gauge. The PMIC may use a wired and/or wireless charging method. The wireless charging method may include, for example, a magnetic resonance method, a magnetic induction method, an electromagnetic method, an acoustic method, and the like. Additional circuits, for example, a coil loop, resonance circuit, rectifier, and the like, for wireless charging may be further included. The battery gauge may measure, for example, a residual quantity of the battery 296, and a voltage, current, or temperature during the charging. The battery 296 may include, for example, a rechargeable battery or solar battery.

The indicator 297 may display a particular state, for example, a booting state, message state, charging state, or the like, of the electronic device 201 or a part (for example, the processor 210) of the electronic device 201. The motor 298 may convert an electrical signal into mechanical vibration, and may generate vibration, a haptic effect, or the like. Although not illustrated, the electronic device 201 may include a processing unit (for example, a GPU) for supporting a mobile TV. The processing unit for supporting mobile TV may, for example, process media data according to a certain standard such as digital multimedia broadcasting (DMB), digital video broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
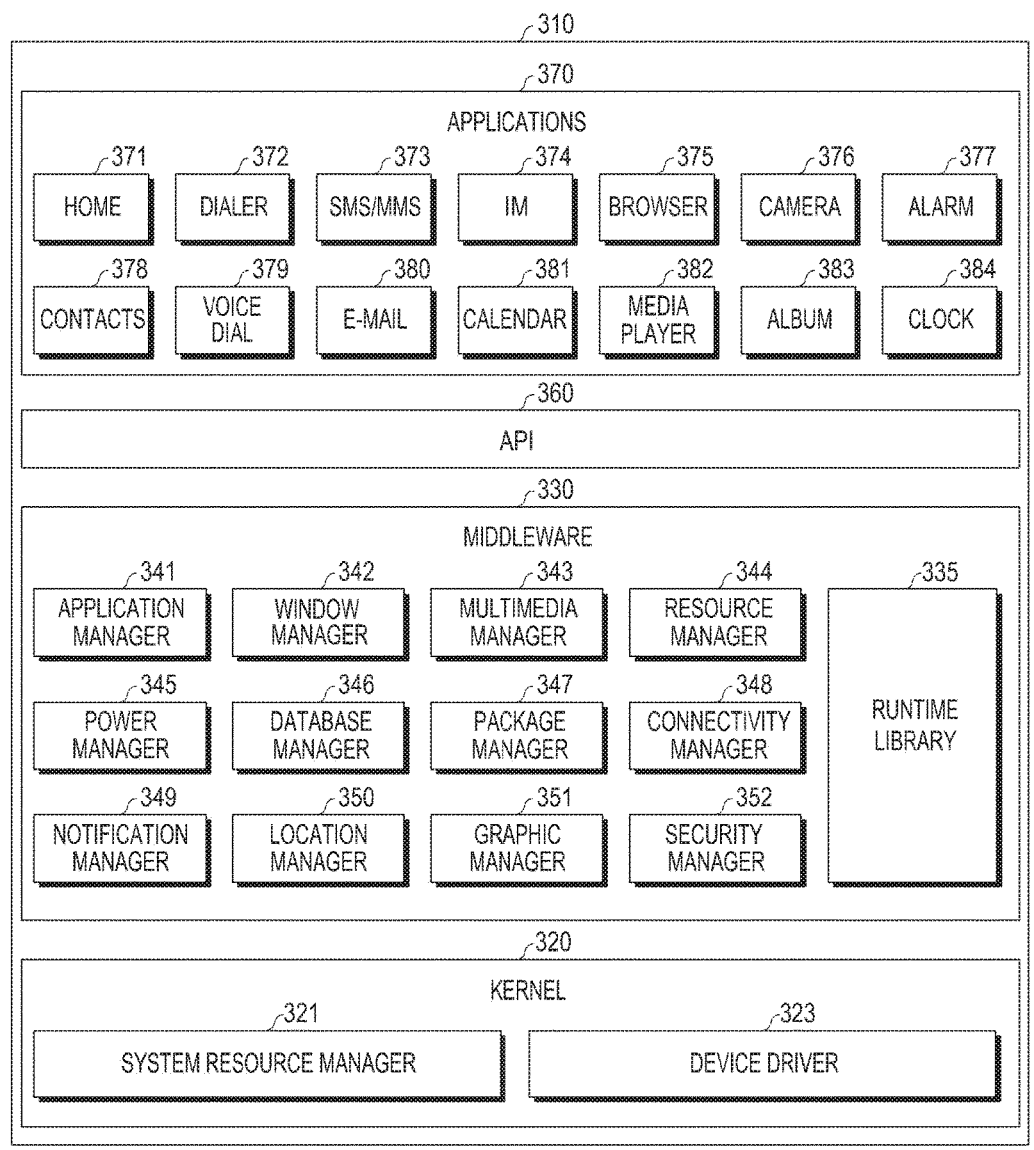
FIG. 3 is a block diagram of a program module according to various embodiments of the present disclosure.

FIG. 3 is a block diagram of a program module according to various embodiments of the present disclosure.

Referring to FIG. 3, a program module 310 (for example, the program 140) may include an OS for controlling resources related to the electronic device (for example, the electronic device 101) and/or various applications (for example, the application programs 147) executed in the operating system. The OS may be, for example, Android, iOS, Windows, Symbian, Tizen, Bada, or the like.

The program module 310 includes a kernel 320, middleware 330, an API 360, and/or applications 370. At least some of the program module 310 may be preloaded on an electronic device, or may be downloaded from an external electronic device (for example, the electronic device 102 or 104, or the server 106).

The kernel 320 (for example, the kernel 141 of FIG. 1) may include, for example, a system resource manager 321 and/or a device driver 323. The system resource manager 321 may perform control, allocation, retrieval, or the like, of system resources. According to an embodiment, the system resource manager 321 may include a process manager, memory manager, file system manager, or the like. The device driver 323 may include, for example, a display driver, camera driver, Bluetooth driver, shared memory driver, USB driver, keypad driver, Wi-Fi driver, audio driver, or inter-process communication (IPC) driver.

The middleware 330 may provide a function required by the applications 370 in common, or provide various functions to the applications 370 through the API 360 so that the applications 370 can efficiently use limited system resources within the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform input/output management, memory management, functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device (for example, the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements as required.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as home 371, dialer 372, short message service (SMS)/multimedia message service (MMS) 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of the description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device 101 (for example, an SMS/MMS application, e-mail application, health management application, or environmental information application). Further, the notification relay application may receive notification information from, for example, an external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device or some components thereof, or a function of adjusting luminance or a resolution of the display), applications operating in the external electronic device, or services provided by the external electronic device (for example, a call service and a message service).

According to an embodiment of the present disclosure, the applications 370 may include an application (for example, a health care application of a mobile medical device or the like) designated according to an attribute of the external electronic device (for example, the electronic device 102 or 104). According to an embodiment, the applications 370 may include an application received from the external electronic device (for example, the server 106, or the electronic device 102 or 104). According to an embodiment of the present disclosure, the applications 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination thereof. At least some of the program module 310 may be implemented (for example, executed) by, for example, the processor (for example, the processor 120). At least some of the program module 310 may include, for example, a module, program, routine, set of instructions, and/or process for performing one or more functions.

The term "module" as used herein may, for example, mean a unit including one of hardware, software, and firmware, or a combination thereof. The term "module" may also be interchangeably used with, for example, the term "unit", "logic", "logical block", "component", or "circuit". The "module" itself may be a minimum unit of an integrated component element or a part thereof. The "module" may also be a minimum unit for performing one or more functions or a part thereof. The "module" may be mechanically or electronically implemented.

For example, a "module" according to the present disclosure may include at least one of an application-specific IC (ASIC) chip, field-programmable gate arrays (FPGA), and programmable-logic device for performing operations which are known to those skilled in the art, or are to be developed hereinafter.

According to various embodiments of the present disclosure, at least some of the devices (for example, modules or functions thereof) or the method (for example, operations) according to the present disclosure may be implemented by a command stored in a non-transitory computer-readable storage medium in a programming module form. The instruction, when executed by a processor (for example, the processor 120), may cause the one or more processors to execute the function corresponding to the instruction. The computer-readable storage medium may be, for example, the memory 130.

The computer readable recoding medium may include a hard disk, floppy disk, magnetic media (for example, a magnetic tape), optical media (for example, a compact disc ROM (CD-ROM) and DVD), magneto-optical media (for example, a floptical disk), hardware device (for example, a ROM, RAM, flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to describe technical details of the present disclosure and to help with the understanding of the present disclosure, and are not intended to limit the scope of the present disclosure. Accordingly, the scope of the present disclosure should be construed as including all modifications or various other embodiments based on the technical idea of the present disclosure.

Figure 4:
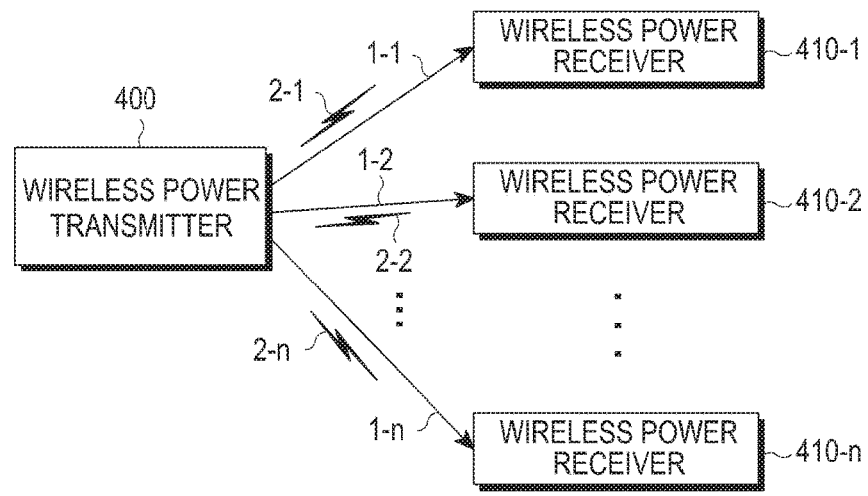
FIG. 4 is a conceptual diagram for describing overall operations of a wireless power transmission system according to various embodiments of the present disclosure.

FIG. 4 is a conceptual diagram for describing overall operations of a wireless power transmission system according to an embodiment of the present disclosure.

Referring to FIG. 4, a wireless power transmission system includes a wireless power transmitter 400 and one or more wireless power receivers 410-1, 410-2, and 410-n.

The wireless power transmitter 400 may wirelessly transmit power 1-1, 1-2, and 1-n to the one or more wireless power receivers 410-1, 410-2, and 410-n, respectively. More specifically, the wireless power transmitter 400 may wirelessly transmit the power 1-1, 1-2, and 1-n to only a wireless power receiver which is authenticated through a predetermined authentication procedure.

The wireless power transmitter 400 may form an electrical connection with the wireless power receivers 410-1, 410-2, and 410-n. For example, the wireless power transmitter 400 may transmit wireless power in a form of electromagnetic waves to the wireless power receivers 410-1, 410-2, and 410-n.

The wireless power transmitter 400 may perform bidirectional communication with the wireless power receivers 410-1, 410-2, and 410-n. The wireless power transmitter 400 and the wireless power receivers 410-1, 410-2, and 410-n may process or transmit packets 2-1, 2-2, and 2-n including predetermined frames. The frames will be described below in greater detail. The wireless power receiver may be implemented by a mobile communication terminal, PDA, PMP, smart phone, or the like. According to various embodiments of the present disclosure, the wireless power receiver may be implemented by a TV, monitor, home appliance, electric car, or the like.

The wireless power transmitter 400 may wirelessly provide power to the plurality of wireless power receivers 410-1, 410-2, and, 410-n. For example, the wireless power transmitter 400 may transmit the power to the plurality of wireless power receivers 410-1, 410-2, and 410-n through a resonance scheme. When the wireless power transmitter 400 adopts the resonance scheme, it is preferable that distances between the wireless power transmitter 400 and the plurality of wireless power receivers 410-1, 410-2, and 410-n is 30 m or less. Further, when the wireless power transmitter 400 adopts an electromagnetic induction scheme, it is preferable that the distances between the wireless power transmitter 400 and the plurality of wireless power receivers 410-1, 410-2, and 410-n is 10 cm or less.

The wireless power receivers 410-1, 410-2, and 410-n may receive wireless power from the wireless power transmitter 400 and provide the power to loads (not shown) electrically connected to the wireless power receivers 410-1, 410-2, and 410-n. Further, the wireless power receivers 410-1, 410-2, and 410-n may transmit a signal requesting a wireless power transmission, information necessary for a wireless power reception, information on statuses of the wireless power receivers, or information on a control of the wireless power transmitter 400 to the wireless power transmitter 400. Information on the transmitted signal will be described below in greater detail.

Further, the wireless power receivers 410-1, 410-2, and 410-n may transmit a message indicating a wireless power reception status of each of the wireless power receivers 410-1, 410-2, and 410-n to the wireless power transmitter 400. Information on the transmitted signal will be described below in greater detail.

The wireless power transmitter 400 may include a display means such as a display, and may display a status of each of the wireless power receivers 410-1, 410-2, and 410-n based on the message received from each of the wireless power receivers 410-1, 410-2, and 410-n. The wireless power transmitter 400 may also display information on an amount of power which the wireless power receivers 410-1, 410-2, and 410-n supply to the respective loads.

The wireless power transmitter 400 may also transmit a control signal for disabling a wireless power reception function to each of the wireless power receivers 410-1, 410-2, and 410-n. The wireless power receivers having received the control signal for disabling the wireless power reception function from the wireless power transmitter 400, may then disable the wireless power reception function.

Figure 5:
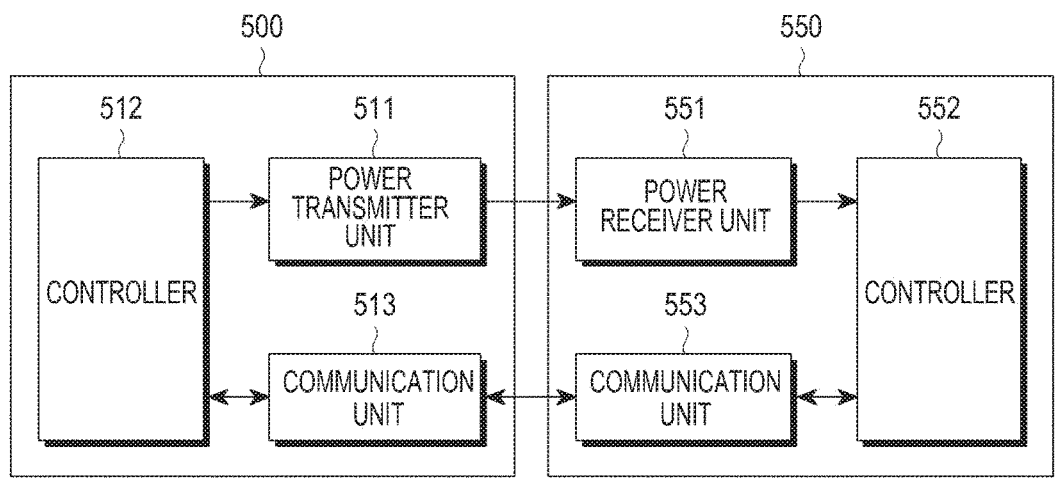
FIG. 5 is a block diagram illustrating a wireless power transmitter and a wireless power receiver according to various embodiments of the present disclosure.

FIG. 5 is a block diagram illustrating a wireless power transmitter and a wireless power receiver according to various embodiments of the present disclosure.

Referring to FIG. 5, a wireless power transmitter 500 includes a power transmitting unit 511, a controller 512, and a communication unit 513. Further, the wireless power receiver 550 includes a power receiving unit 551, a controller 552 and a communication unit 553.

The power transmitting unit 511 may supply power which is required by the wireless power transmitter 500, and wirelessly provide power to the wireless power receiver 550. Here, the power transmitting unit 511 provides the power in an alternating current (AC) waveform, or may convert power in a direct current (DC) waveform, which is being supplied, into the power in the AC waveform by using an inverter and provide the power in the AC waveform. The power transmitting unit 511 may be implemented in a form of an embedded battery or in a form of a power reception interface so as to receive the power from outside and supply the power to other elements. It will be easily understood by those skilled in the art that embodiments of the power transmitting unit 511 can include any arrangement of elements that can supply power in a constant AC waveform.

In addition, the power transmitting unit 511 may supply the AC waveform to the wireless power receiver 550 in a form of electromagnetic waves. According to various embodiments of the present disclosure, the power transmitting unit 511 may include a loop coil and accordingly, can transmit or receive predetermined electromagnetic waves. When the power transmitting unit 511 is implemented by the loop coil, inductance L of the loop coil may change. It will be easily understood by those skilled in the art that embodiments of the power transmitting unit 511 can include any arrangement of elements that can transmit and receive the electromagnetic waves.

The controller 512 may control overall operations of the wireless power transmitter 500. The controller 512 may control overall operations of the wireless power transmitter 500 by using algorithms, programs, or applications for control, which can be read from a storage unit (not shown). The controller 512 may be implemented in a form of a CPU, microprocessor, or mini-computer. Detailed operations of the controller 512 will be described below in greater detail.

The communication unit 513 may communicate with the wireless power receiver 550 through a predetermined scheme. The communication unit 513 may communicate with the communication unit 553 of the wireless power receiver 550 by using a NFC scheme, ZigBee communication scheme, infrared ray communication scheme, visible ray communication scheme, Bluetooth communication scheme, Bluetooth low energy scheme, and the like. The communication unit 513 according to various embodiments of the present disclosure may perform communication by using a Bluetooth low energy scheme. In addition, the communication unit 513 may use a carrier sense multiple access with collision avoidance (CSMA/CA) algorithm. A selection of the frequency and channel which the communication unit 513 uses will be described below in greater detail. The aforementioned communication schemes are only examples, and the scope of the present disclosure is not limited by a specific communication scheme which is performed by the communication unit 513.

The communication unit 513 may transmit a signal for information on the wireless power transmitter 500. Here, the communication unit 513 may unicast, multicast, or broadcast the signal.

The communication unit 513 may also receive power information from the wireless power receiver 550. The power information may include at least one of a capacity of the wireless power receiver 550, for example, a capacity of a capacitor included in the wireless power receiver 550, and information on a load driven by the wireless power receiver 550, for example, a maximum load power level of the load, a minimum load power level of the load, a rated power level of the load, and a used load power level according to a load change in the load. Further, the communication unit 513 may transmit a wireless power reception function control signal for controlling the wireless power reception function of the wireless power receiver 550. The wireless power reception function control signal may be a control signal for controlling the wireless power receiving unit 551 of the specific wireless power receiver 550 to enable or disable a wireless power reception function.

The communication unit 513 may receive other signals from other wireless power transmitters (not shown), as well as from the wireless power receiver 550. Although FIG. 5 illustrates that the power transmitting unit 511 and the communication unit 513 are configured as separate hardware and the wireless power transmitter 500 communicates in an out-band manner, this is only an example and embodiments are not limited thereto. In the present disclosure, the power transmitting unit 511 and the communication unit 513 may be implemented as combined hardware so that the wireless power transmitter 500 may perform communication in an in-band manner.

The wireless power transmitter 500 and the wireless power receiver 550 may transmit and receive various signals. Accordingly, the wireless power receiver 550 may subscribe to a wireless power network which is managed by the wireless power transmitter 500, and wireless power reception through wireless power transmission and reception may be performed. The above mentioned process will be described below in greater detail.

As illustrated in FIG. 5, the wireless power receiver 550 includes the power receiving unit 551, the controller 552, and the communication unit 553.

The power receiving unit 551 may wirelessly receive power transmitted from the wireless power transmitter 500. The power receiving unit 551 may receive power in an AC waveform, but embodiments are not limited thereto.

The controller 552 may control overall operations of the wireless power receiver 550. The controller 552 may control the overall operations of the wireless power receiver 550 by using algorithms, programs, or applications for control, which can be read from a storage unit (not shown). The controller 552 may be implemented in a form of a CPU, microprocessor, or mini-computer.

The communication unit 553 may communicate with the wireless power transmitter 500 through a predetermined scheme. The communication unit 553 may transmit power information to the wireless power transmitter 500. The power information may include at least one of a capacity of the wireless power receiver 550, for example, a capacity of a capacitor included in the wireless power receiver 550, and information on a load driven by the wireless power receiver 550, for example, a maximum load power level of the load, a minimum load power level of the load, a rated power level of the load, and a used load power level according to a load change in the load. Further, the communication unit 553 may receive a wireless power reception function control signal for controlling the wireless power reception function of the wireless power receiver 550. The wireless power reception function control signal may be a control signal for controlling the wireless power receiving unit 551 of the specific wireless power receiver 550 to enable or disable a wireless power reception function. Further, the wireless power reception function control signal may include information related to a power control or a power control command corresponding to the generation of an unusual situation according to various embodiments of the present disclosure.

The wireless power receiver according to an embodiment may be an Internet of Things (IoT) device (for example, a light bulb, various sensors, a fire alarm, and a thermostat) which does not include a battery and an IoT sensor which does not include a battery.

The power transmitting unit 511 of the wireless power transmitter 500 may wirelessly provide power to the wireless power receiver 550 (for example, IoT device). The power transmitting unit 511 may transmit power to the wireless power receiver 550 (for example, IoT device) which does not include a battery in at least one of a magnetic resonance type, a magnetic induction type, and an electromagnetic wave type.

The wireless power transmitter 500 may transmit turned-on power to the wireless power receiver 550 and transmit wireless power to the wireless power receiver 550 according to information on a load received from the wireless power receiver 550. The wireless power transmitter 500 may transmit power corresponding to the information on the use load received from the wireless power receiver 550 to the wireless power receiver 550.

Figure 8A:
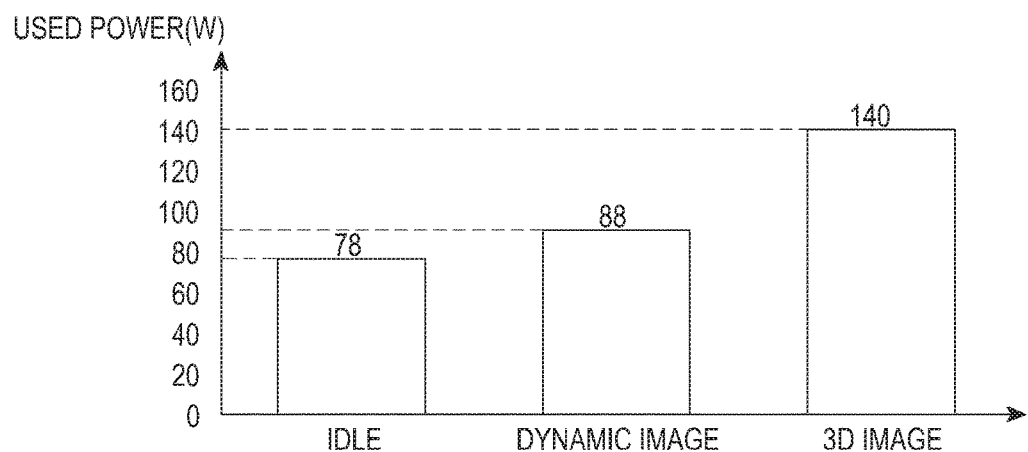
FIGS. 8A and 8B are graphs illustrating an example of a load change according to various embodiments of the present disclosure.
Figure 8B:
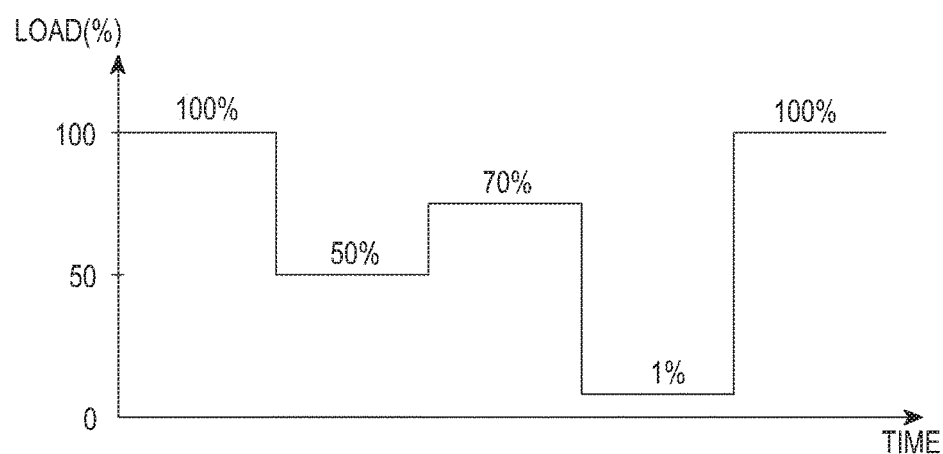

The wireless power receiver 550 may be influenced by a rapid load change based on a time axis. Specifically, the wireless power receiver 550 may be rapidly load-changed (for example, an idle state or an operation state) according to the operation state of the wireless power receiver 550 as illustrated in FIG. 8B.

The wireless power transmitter 500 may transmit wireless power to the wireless power receiver 550 with optimum efficiency within a range of a first level (for example, reference power level) determined according to the information on the load received from the wireless power receiver 550.

The wireless power receiver 550 may supply the received wireless power to the load and acquire information (for example, use load power level) according to a load change due to the power supply. The wireless power transmitter 500 may receive the use load power level transmitted from the wireless power receiver 550 through the communication unit 513.

The wireless power transmitter 500 may transmit power controlled to be at a power level corresponding to the received use load power level to the wireless power receiver 550 through the power transmitting unit 511. For example, when the use load power level is smaller than the power of the first level (for example, idle state), the wireless power transmitter 500 may stop transmitting the power of the first level while the power of the first level, which is larger than the use load power level, is run out (for example, period in which the load can normally operate by a charge charged in a capacitor).

When the power of the first level has run out, the wireless power transmitter 500 may re-transmit the power of the first level to the wireless power receiver 550. Further, when the use load power level is smaller, the wireless power transmitter 500 may stop transmitting the power of the first level. In addition, when the use load power level rapidly increases, the wireless power transmitter 500 may convert the power of the first level to correspond to the use load power level and transmit the power.

The wireless power receiver according to an embodiment of the present disclosure may include a multi-functional IoT sensor which does not include a battery (for example, multi-functional IoT sensor having a temperature sensor, a humidity sensor, and a motion sensor).

The power transmitting unit 511 of the wireless power transmitter 500 may wirelessly provide power to the wireless power receiver 550 (for example, multi-functional IoT sensor). The power transmitting unit 511 may transmit power to the wireless power receiver 550 (for example, multi-functional IoT sensor) which does not include a battery in at least one of a magnetic resonance type, a magnetic induction type, and an electromagnetic wave type.

The wireless power transmitter 500 may transmit turned-on power to the wireless power receiver 550 (for example, multi-functional IoT sensor) and transmit wireless power to the wireless power receiver 550 according to information on a load received from the wireless power receiver 550. The wireless power transmitter 500 may transmit power corresponding to information on a use load (for example, operation of only one sensor, operation of a plurality of sensors, operation of all sensors, or idle state) received from the wireless power receiver 550 to the wireless power receiver 550.

The wireless power receiver 550 (for example, multi-functional IoT sensor) may receive an influence by a load change based on a time axis. The wireless power receiver 550 (for example, multi-functional IoT sensor) may be load-changed (for example, operation of only one sensor, operation of a plurality of sensors, operation of all sensors, or idle state) according to an operation state of the wireless power receiver 550 as illustrated in FIG. 8B.

The wireless power transmitter 500 may transmit wireless power to the wireless power receiver 550 with optimum efficiency within a range of a first level (for example, reference power level) determined according to the information on the load received from the wireless power receiver 550 (for example, multi-functional IoT sensor).

The wireless power receiver 550 (for example, multi-functional IoT sensor) may supply the received wireless power to the load and acquire information (for example, use load power level) according to a load change of the wireless power receiver 550 (for example, operation of only one sensor, operation of a plurality of sensors, operation of all sensors, or idle state). The wireless power transmitter 500 may receive the use load power level transmitted from the wireless power receiver 550 (for example, IoT sensor) through the communication unit 513.

The wireless power transmitter 500 may transmit power controlled to be at the power level corresponding to the use load power level to the wireless power receiver 550 (for example, multi-functional IoT sensor) through the power transmitting unit 511. For example, when the use load power level is smaller than the power of the first level (for example, idle state), the wireless power transmitter 500 may stop transmitting the power of the first level while the power of the first level, which is larger than the use load power level, is run out (for example, period in which the load can normally operate by a charge charged in a capacitor).

When the power of the first level has run out, the wireless power transmitter 500 may re-transmit the power of the first level to the wireless power receiver 550. Further, when the use load power level becomes smaller, the wireless power transmitter 500 may stop transmitting the power of the first level. In addition, when the use load power level rapidly increases (for example, when all sensors operate), the wireless power transmitter 500 may convert the power of the first level to correspond to the use load power level and transmit the power.

According to an embodiment of the present disclosure, the multi-functional IoT sensor may transmit information on the type of sensing operation (temperature sensing, humidity sensing, and motion sensing) to the wireless power transmitter 500. Further, the wireless power transmitter 500 may store information on the wireless power level which should be transmitted according to the type of sensing operation of the multi-functional IoT sensor. The wireless power transmitter 500 may identify the power level which should be transmitted to the multi-functional IoT sensor based on the information on the type of sensing operation received from the multi-functional IoT sensor and transmit wireless power corresponding to the identified level to the multi-functional IoT sensor. According to another embodiment, the multi-functional IoT sensor may transmit a power level required according to the type of sensing operation to the wireless power transmitter 500, and the wireless power transmitter 500 may transmit power corresponding to the received power level to the multi-functional IoT sensor.

Figure 6:
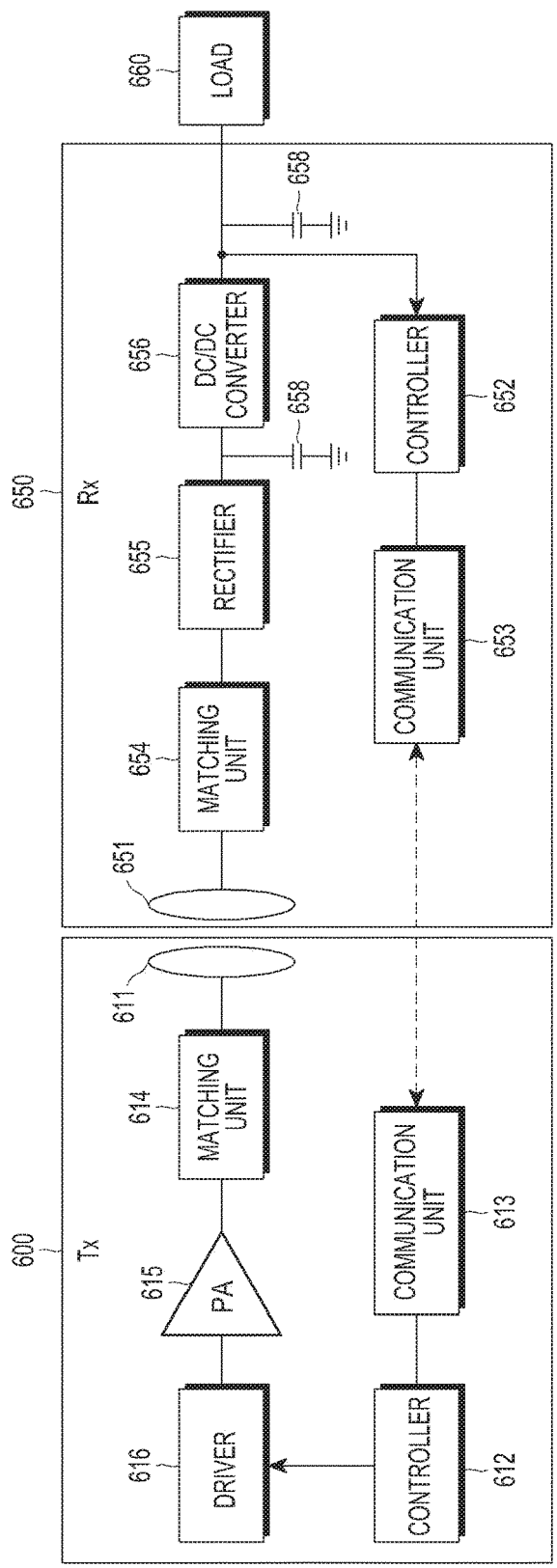
FIG. 6 is a detailed block diagram illustrating a wireless power transmitter and a wireless power receiver according to an embodiment of the present disclosure.

FIG. 6 is a detailed block diagram illustrating a wireless power transmitter and a wireless power receiver according to an embodiment of the present disclosure.

Referring to FIG. 6, a wireless power transmitter 600 includes at least one of a Tx resonator 611, a controller 612 (for example, multipoint controller unit (MCU)), a communication unit 613 (for example, an out-of-band signaling unit), a matching unit or circuit 614, a power amplifier (PA) 615, and a driver 616. The wireless power receiver 650 may include at least one of an Rx resonator 651, a controller 652, a communication unit 653, a matching unit or circuit 654, a rectifier 655, a DC/DC converter 656, and a capacitor or capacitor bank 658. The wireless power receiver 650 may be electrically connected to a load 660 and provide to the load 660 received wireless power from the wireless power transmitter 600. The capacitor or capacitor bank 658 may include a number of switches or other features to permit controlled charging and discharging of the capacitor or capacitor bank 658.

Referring to the wireless power transmitter 600, the driver 616 may output DC power having a preset voltage value. The voltage value of the DC power output from the driver 616 may be controlled by the controller 612.

The DC power output from the driver 616 may be output to the PA 615. The PA 615 may amplify the DC power by a preset gain. Further, the DC power may be converted into AC power based on a signal input from the controller 612. Accordingly, the PA 615 may output the AC power.

The matching circuit 614 may perform impedance matching. For example, the output power may be controlled to have high efficiency or high capacity by adjusting impedance viewed from the matching circuit 614.

The matching circuit 614 may adjust the impedance based on a control of the controller 612. The matching circuit 614 may include at least one of a coil and a capacitor. The controller 612 may control a connection state with at least one of the coil and the capacitor and, accordingly, perform the impedance matching.

The Tx resonator 611 may transmit the input AC power to the Rx resonator 651. The Tx resonator 611 and the Rx resonator 651 may be implemented by resonant circuits having the same resonance frequency. For example, the resonance frequency may be determined as 6.78 MHz.

The communication unit 613 may communicate with the communication unit 653 of the wireless power receiver 650, and perform communication (via Wi-Fi, ZigBee, or Bluetooth/Bluetooth low energy, and the like) with, for example, a bidirectional 2.4 GHz frequency.

In this manner, the Rx resonator 651 may receive power from the wireless power transmitter 600.

The matching circuit 654 may perform impedance matching. For example, the output power may be controlled to have high efficiency or high capacity by adjusting impedance viewed from the matching circuit 654.

The matching circuit 654 may adjust the impedance based on a control of the controller 652. The matching circuit 654 may include at least one of a coil and a capacitor. The controller 652 may control a connection state with at least one of the coil and the capacitor and, accordingly, perform the impedance matching.

The rectifying unit 655 may rectify wireless power received by the Rx resonator 651 in the DC form, and may be implemented in, for example, a form of a bridge diode, but embodiments are not limited thereto.

The DC/DC converter 656 may convert the rectified power into a predetermined gain. For example, the DC/DC converter 656 may convert the rectified power in such a manner that a voltage of an output terminal of the DC/DC converter 656 becomes 5 V. A minimum value and a maximum value of the voltage, which can be applied to the load, may be set at a front end of the DC/DC converter 656.

The capacitor 658 may be included within the wireless power receiver 650. The capacitor 658 may be temporarily charged with power received from the wireless power transmitter 600 and may be discharged to provide the charged power to the load 660. For example, the number of capacitors 658 may be one or more, and the capacitor 658 may be located between the rectifying unit 655 and the DC/DC converter 656. Alternatively, the capacitor 658 may be located between the DC/DC converter 656 and the load 660 electrically connected to the wireless power receiver 650. Moreover, the capacitor 658 may be a capacitor included in the DC/DC converter 656.

The load 660 may be electrically connected to the wireless power receiver 650, which receives power from the wireless power transmitter 600. The load 660 may be directly connected to the DC/DC converter 656, and may be implemented as a TV, monitor, home appliance, or the like, which can be driven through reception of the converted power input from the DC/DC converter 656.

According to various embodiments of the present disclosure, the load 660 and the wireless power receiver 650 may directly receive wireless power in real time without a separate battery therebetween. In this case, the load 660 has a considerably wide load change range according to the driving of the load, and the load change is made within a short time in real time. According to the present disclosure, in order to solve the above problems, a range of a wireless power level, at which a load change of the load can be handled, may be configured without additional circuits in the wireless power transmitter, and the wireless power receiver and wireless power transmission may be controlled to transmit only as much wireless power as the load uses within the configured range. Accordingly, even in an environment which is not a battery environment or for a condition in which a load change width is wide and rapidly varies such as supplying wireless power to the electronic device in real time, the wireless power may be stably transmitted with a high efficiency.

According to an embodiment of the present disclosure, the controller 612 of the wireless power transmitter 600 may transmit turn-on power, which may turn on the wireless power receiver 650. The turn-on power may be a signal for detecting the wireless power receiver 650 to which the wireless power transmitter 600 can transmit wireless power. For example, the turn-on power may be a power beacon signal including a short beacon or a long beacon. Further, the turn-on power may have an amount of power which can drive the communication unit 653 of the wireless power receiver 650. For example, the wireless power receiver 650 may receive the turn-on power and drive the communication unit 653 so as to communicate with the wireless power transmitter 600.

When communication with the wireless power receiver 650 is connected, the controller 612 of the wireless power transmitter 600 may receive information on the load 660 electrically connected to the wireless power receiver 650 from the wireless power receiver 650. The information may include a capability of the wireless power receiver 650, for example, a capacity of the capacitor 658 included in the wireless power receiver 650, and information on a charging/discharging speed of the capacitor 658. Further, information on the load 660 may include at least one of a capacity of the load, for example, a maximum load power level of the load, a minimum power level of the load, a rated power level of the load, and a used load power level according to a load change in the load.

The controller 612 may determine a reference power level, which allows wireless power to be continuously transmitted without influence of a load change in the load, based on the information on the load, particularly, the maximum power level of the load. The reference power level may be determined within a range which is smaller than the maximum load power level and larger than the turn-on power. For example, the controller 612 may identify the maximum power level of the load and determine a range of the power level at which the wireless power transmitter 600 can transmit the wireless power in real time based on the identified maximum power level. Further, the controller 612 may determine a power level at which the wireless power can be transmitted with an optimal efficiency within the determined range of the power level. For example, when the maximum power level of the load is 100 W and the power level which can be changed by the wireless power transmitter 600 at one time is 30 W, the range of the power level, at which the wireless power can be changed in real time, may be 100 W to 70 W. Further, the controller 612 may determine, as the reference power level, the power level at which the wireless power may have the optimal efficiency within the range, for example, a minimum power level 70 W within the range.

The controller 612 of the wireless power transmitter 600 may transmit the power of the reference power level determined based on the maximum load power level of the load to the wireless power receiver 650. To this end, the controller 612 may control the DC power output to the PA 615 from the driver 616 to have a value which allows the power of the reference power level to be output.

The controller 612 of the wireless power transmitter 600 may transmit the power of the reference power level to the wireless power receiver 650 and receive information according to a load change in the load 660 from the wireless power receiver 650. The information may include information on used load power which is used by the load 660. Further, the information on the used load power may be information indicating a level of power at a time point when the power is applied to the load 660 from the wireless power receiver 650, rather than a power amount indicating an amount of power used over a predetermined time, since the transmission of the wireless power is performed in real time and the wireless power is immediately used simultaneously with the transmission. To this end, the controller 652 of the wireless power receiver 650 may detect a voltage value and a current value between the DC/DC converter 656 and the load 660 and acquire a level of power by using the detected voltage value and current value. Further, the controller 652 may transmit the acquired power level to the wireless power transmitter 600.

The controller 612 of the wireless power transmitter 600 may control the power level transmitted to the wireless power receiver 650 according to the information on the used load power level received from the wireless power receiver 650. For example, when the used load power level is lower than the reference power level, the controller 612 may control stopping of the transmission of the power of the reference power level during a predetermined condition. The predetermined condition may include a condition under which the load 660 can be normally operated by an electric discharge of the capacitor 658 included in the wireless power receiver 650. Further, the predetermined condition may include a capacity of the capacitor 658. To this end, the capacitor 658 is included within the wireless power receiver 650, and the power may be directly supplied to the load 660 by the electric discharge of the capacitor 658.

Accordingly, when the power used by the load 660 is lower than the reference power level received from the wireless power transmitter 600, the controller 612 of the wireless power transmitter 600 and/or the controller 652 of the wireless power receiver 650 may direct the temporary storage of the excess power (that is, charging the capacitor 658) according to the capacity of the capacitor 658 included in the wireless power receiver 650. Thereafter, during the predetermined condition, the controller 612 of the wireless power transmitter 600 may control whether to transmit or stop transmitting the wireless power according to whether the temporarily stored power in the capacitor 658 included in the wireless power receiver 650 is used, rather than simply changing the transmitted wireless power to a lower power, so that the power used by the load 660 may be smoothly transmitted without an unnecessary power supply to the load 660 or an excessive power level change.

Further, the controller 612 may transmit the power of the reference power level when the predetermined condition is released. In addition, when the used load power level is higher than the reference power level, the controller 612 may transmit power of a power level corresponding to the (higher) used load power level. At this time, although the used load power level is the maximum load power level of the load 660, the wireless power transmitter 600 may convert the reference power level into the maximum load power level at a time needed and provide the power. Accordingly, a problem of stopping of the transmission of the wireless power does not occur.

Referring to FIG. 6, the wireless power transmitter 600 is substantially similar to the wireless power transmitter 500 of FIG. 5. Further, the wireless power receiver 650 is substantially similar to the wireless power receiver 550 of FIG. 5. For example, the wireless power receiver 650 may include the wireless power receiver of FIG. 5 (for example, IoT device including a battery, IoT device which having no battery, multi-functional IoT sensor including battery, and multi-functional IoT sensor having no battery).

The wireless power receiver 550 of FIG. 5 may include at least one of an Rx resonator 651, a controller 652, a communication unit 653, a matching circuit 654, a rectifier 655, a DC/DC converter 656, and a load 660 like the wireless power receiver 650 of FIG. 6.

Figure 7:
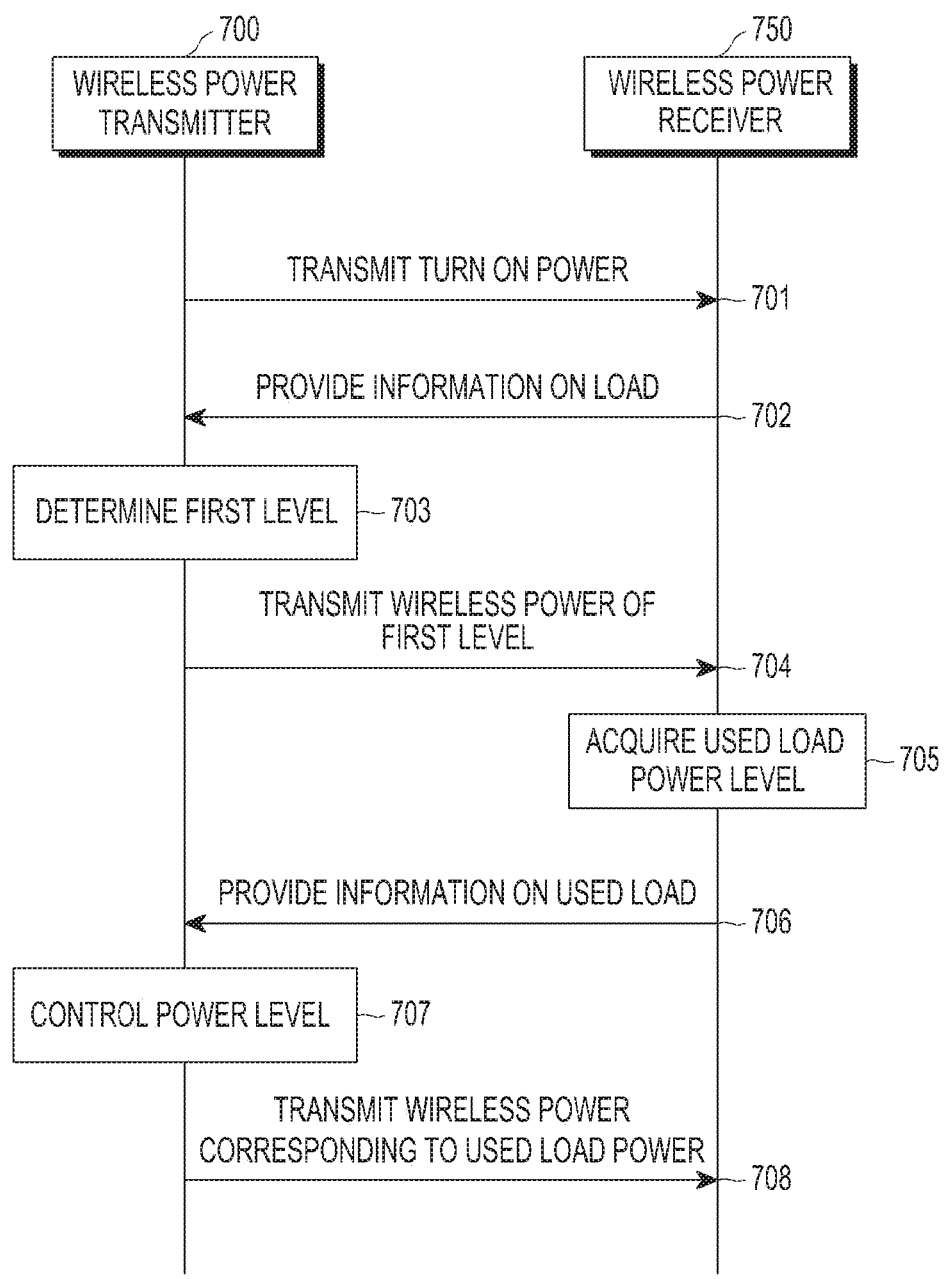
FIG. 7 is a flowchart illustrating a process of transmitting wireless power to a wireless power receiver by a wireless power transmitter according to various embodiments of the present disclosure.
Figure 9:
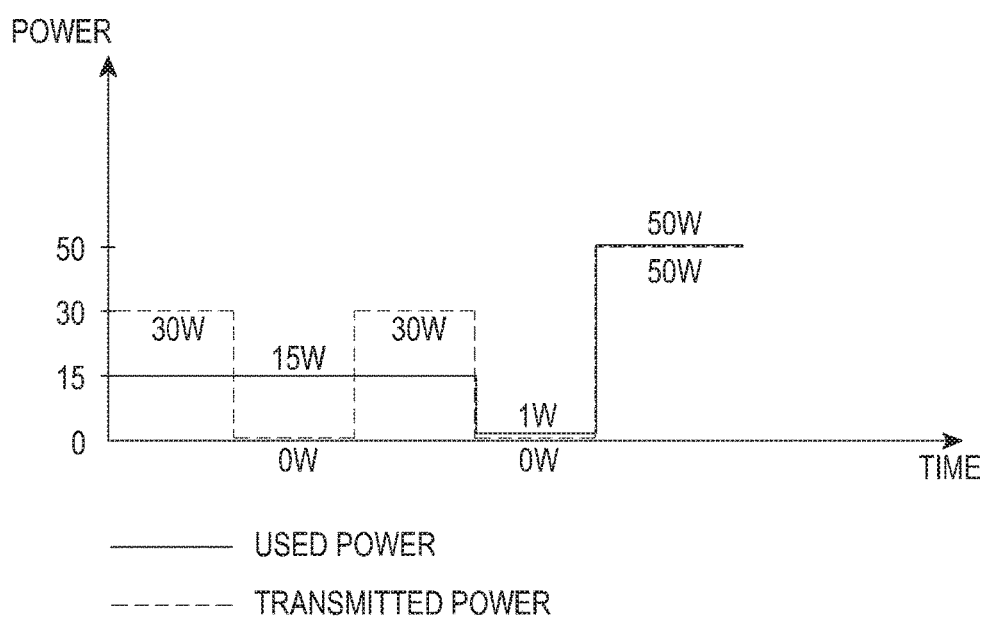
FIG. 9 is a view illustrating wireless power transmission according to various embodiments of the present disclosure.

Referring to FIGS. 7 to 9, a process in which a wireless power transmitter transmits wireless power to a wireless power receiver according to various embodiments of the present disclosure will be described.

Referring to FIG. 7, in operation 701, a wireless power transmitter 700 may transmit turn-on power to a wireless power receiver 750. The turn-on power may be a signal for detecting the wireless power receiver 750 to which the wireless power transmitter 700 can transmit wireless power. For example, the turn-on power may be a power beacon signal including a short beacon or a long beacon. The turn-on power may have a power amount with which the communication unit of the wireless power receiver 750 can be driven.

The wireless power receiver 750 may receive the turn-on power from the wireless power transmitter 700 and drive the communication unit, so as to communicate with the wireless power transmitter 700. When communication with the wireless power transmitter 700 is connected, the wireless power receiver 750 may transmit information on a load electrically connected to the wireless power receiver 750 in operation 702. The information may include a capability of the wireless power receiver 750, for example, a capacity of a capacitor included in the wireless power receiver 750, and information on a charging/discharging speed of the capacitor. Further, the information on the load may include at least one of a capacity of the load, for example, a maximum load power level of the load, a minimum power level of the load, a rated power level of the load, and a used load power level according to a load change in the load.

A wireless power transmission method according to various embodiments of the present disclosure does not include a separate battery between the wireless power receiver 750 and the load. The wireless power transmitter 700 may provide wireless power required by the load to the wireless power receiver 750 in real time without influence of a load change in the load. For example, in a case of a load such as a household TV which is not a battery environment as illustrated in FIG. 8A, an amount of power consumption may vary considerably depending on a driven mode, for example, an IDLE (78 W), a video or other dynamic image (88 W), and a three-dimensional (3D) image (140 W). In a case of a load which is not a battery environment as illustrated in FIG. 8B, a rapid load change may occur based on a time axis. For example, a rate of the load may change from 100% to 50%, from 50% to 70%, from 70% to 1%, or from 1% to 100%, just to name a few. That is, a user may view a general dynamic image while viewing a 3D image having high power consumption, and may switch to a standby mode while viewing the general dynamic image or the 3D image. As described above, the load, which is not a battery environment, has a considerably wide load change range according to the driving mode, and the load change is made within a short time in real time.

In order to solve such a problem, the wireless power transmitter 700 may determine a first level (for example, a reference power level), at which the wireless power transmitter 700 can continuously transmit wireless power without any influence of the load change in the load, based on information on the load, particularly the maximum load power level of the load received from the wireless power receiver 750 in operation 703. The first level may be determined within a range which is smaller than the maximum load power level and larger than the turn-on power. For example, the wireless power transmitter 700 may identify the maximum power level of the load and determine a range of the power level which can be changed for the transmission of wireless power in real time by the wireless power transmitter 700 based on the identified maximum power level. Further, the wireless power transmitter may determine a power level at which the wireless power can be transmitted with an optimal efficiency within the determined range of the power level. For example, when the maximum power level of the load is 100 W and the power level which can be changed by the wireless power transmitter 700 at one time is 30 W, the range of the power level, at which the wireless power can be changed in real time, may range from 100 W to 70 W. Further, the wireless power transmitter 700 may determine the first power level as the power level at which the wireless power may have the optimal efficiency within the range, for example, a minimum power level 70 W within the range.

The wireless power transmitter 700 may transmit power of the first level determined based on the maximum load power level of the load to the wireless power receiver 750 in operation 704.

In operation 705, the wireless power receiver 750 may directly supply the received wireless power to the load and acquire information on a load change in the load. The wireless power receiver 750 may detect a voltage value and a current value between the wireless power receiver 750 and the load, and acquire a used load power level, which is power used by the load, by using the detected voltage value and current value. Since the wireless power transmission is performed in real time and is implemented to be used immediately and simultaneously with the reception, the power used by the load may refer to a used load power level indicating a level of power at a time point when the power is applied to the load from the wireless power receiver, rather than power indicating an amount of power used over a predetermined time.

In operation 706, the wireless power receiver 750 may transmit information on the acquired used load power level to the wireless power transmitter 700. The wireless power receiver 750 may continuously, periodically, aperiodically, or on demand, transmit the information on the acquired used load power level to the wireless power transmitter 700.

In operation 707, the wireless power transmitter 700 may control a power level transmitted to the wireless power receiver according to the received information on the used load power level. For example, when the received used load power level is lower than the first level, the wireless power transmitter 700 may control stopping of the transmission of power of the first level during a predetermined condition. The predetermined condition may include a condition under which the load can be normally operated by an electric discharge of the capacitor included in the wireless power receiver 750. Further, the predetermined condition may include a capacity of the capacitor. When the predetermined condition is released, the wireless power transmitter 700 may transmit the power of the first level. When the used load power level is higher than the first level, the wireless power transmitter 700 may control transmission of power of the power level corresponding to the (higher) used load power level.

In operation 708, the wireless power transmitter 700 may transmit power which is controlled to have a power level corresponding to the used load power level. For example, as illustrated in FIG. 9, when the used load power level (for example, used power) is 15 W and the power of the first level (for example, transmitted power) is 30 W, the used load power level is lower than the power of the first level. Accordingly, the wireless power transmitter 700 may stop the transmission of the power of the first level while the power of the first level, which exceeds the used load power level, is exhausted, that is, while the load can be normally operated by an electric discharge of the capacitor. When the power of the first level is exhausted, the wireless power transmitter 700 may transmit the power of the first level again. When the used load power level is further lowered to 1 W, the wireless power transmitter 700 may stop the transmission of the power of the first level again. When the used load power level rapidly increases to 50 W, the wireless power transmitter 700 may convert the power of the first level into power of 50 W corresponding to the used load power level and transmit the converted power.

Figure 10:
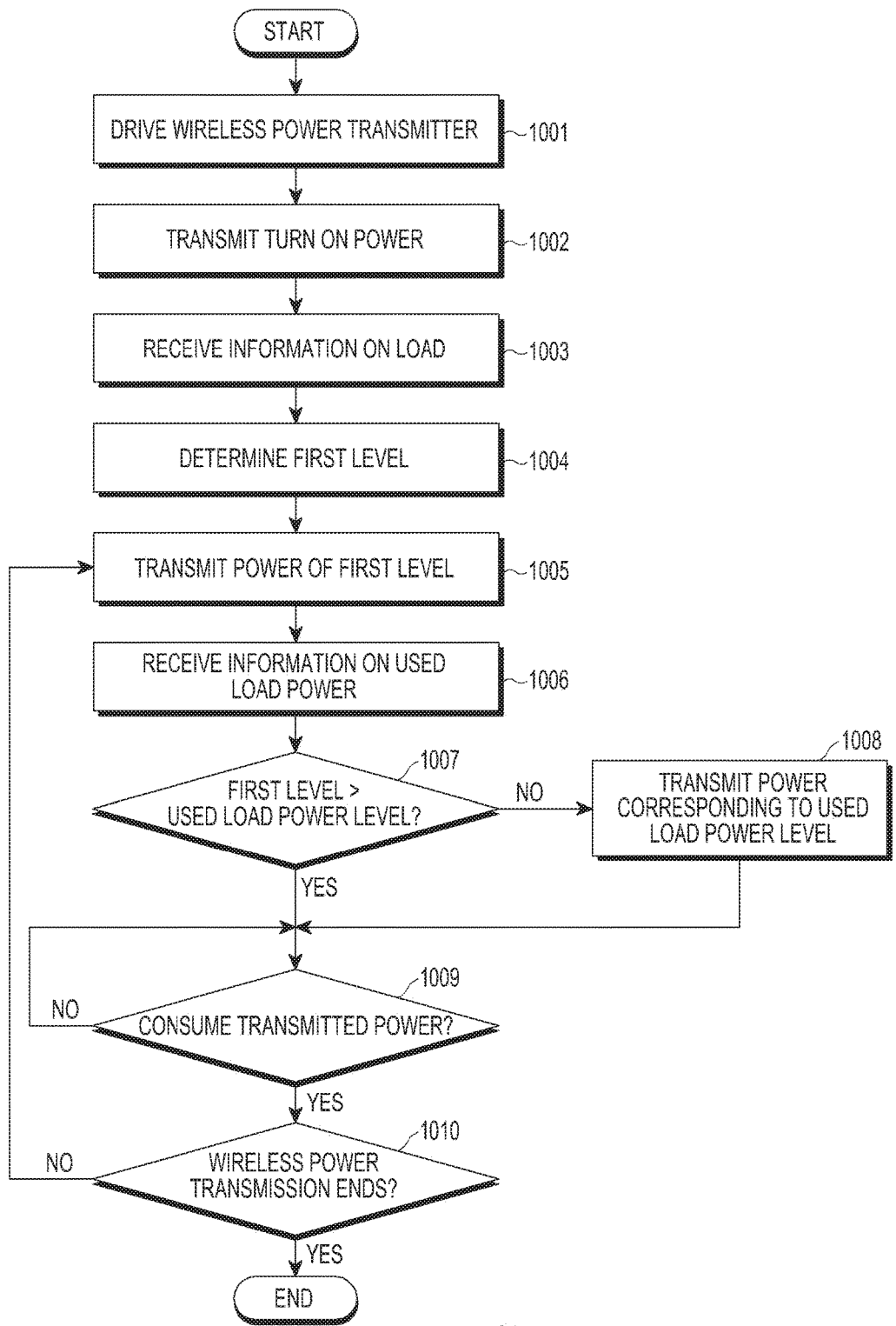
FIG. 10 is a flowchart illustrating a wireless power transmission process of a wireless power transmitter according to an embodiment of the present disclosure.

FIG. 10 is a flowchart illustrating a wireless power transmission process of a wireless power transmitter according to an embodiment of the present disclosure.

Referring to FIG. 10, in operation 1001, the wireless power transmitter (for example, wireless power transmitter 700) may initiate driving. When the driving of the wireless power transmitter is initiated and power is applied, the wireless power transmitter may configure an environment.

In operation 1002, the wireless power transmitter may transmit turn-on power to the wireless power receiver. At this time, the operation of transmitting the turn-on power may correspond to a power saving mode before the wireless power transmitter initiates the transmission of wireless power to the wireless power receiver. The turn-on power transmitted by the wireless power transmitter may be a signal for detecting the wireless power receiver to which the wireless power transmitter can transmit wireless power. For example, the turn-on power may be a power beacon signal including a short beacon or a long beacon. Further, the turn-on power may have power with which the communication unit of the wireless power receiver can be driven.

When the wireless power transmitter establishes a communication connection with the wireless power receiver having received the turn-on power to initiate the operation, the wireless power transmitter may receive information on the load electrically connected to the wireless power receiver in operation 1003. The information may include a capability of the wireless power receiver, for example, a capacity of a capacitor included in the wireless power receiver, and information on a charging/discharging speed of the capacitor. Further, the information on the load may include at least one of a capacity of the load, for example, a maximum load power level of the load, a minimum power level of the load, a rated power level of the load, and a used load power level according to a load change in the load.

In operation 1004, the wireless power transmitter may determine a first level, at which the wireless power transmitter can continuously transmit wireless power without influence of a load change in the load based on information on the load, particularly, a maximum load power level of the load received from the wireless power receiver. The first level may be determined within a range which is smaller than the maximum load power level and larger than the turn-on power. For example, the wireless power transmitter may identify the maximum power level of the load and determine a range of the power level which can be changed for the transmission of wireless power in real time by the wireless power transmitter based on the identified maximum power level. Further, the wireless power transmitter may determine a power level at which the wireless power can be transmitted with an optimal efficiency within the determined range of the power level.

In operation 1005, the wireless power transmitter may transmit power of the determined first level to the wireless power receiver based on the maximum load power level of the load.

In operation 1006, the wireless power transmitter may receive information on used load power according to the load change in the load from the wireless power receiver.

When the received used load power level is higher than the first level in operation 1007, the wireless power transmitter may convert power of the first level into a power level corresponding to the used load power level and transmit power of the power level in operation 1008, and proceed to operation 1009.

When the received used load power level is lower than the first level in operation 1007, the wireless power transmitter may control stopping of the transmission of power of the first level during a predetermined condition in operation 1009. The predetermined condition may include a condition under which the load can be normally operated by an electric discharge of the capacitor included in the wireless power receiver. Further, the predetermined condition may include a capacity of the capacitor. That is, the wireless power transmitter stops the transmission of the wireless power until the power transmitted to the wireless power receiver is exhausted by repeating operation 1009 and, when the transmitted power is exhausted, re-initiates the wireless power transmission operation according to whether the wireless power transmission operation ends in operation 1010. If the wireless power transmission operation does not end in operation 1010, the wireless power transmitter returns to operation 1005.

Figure 11:
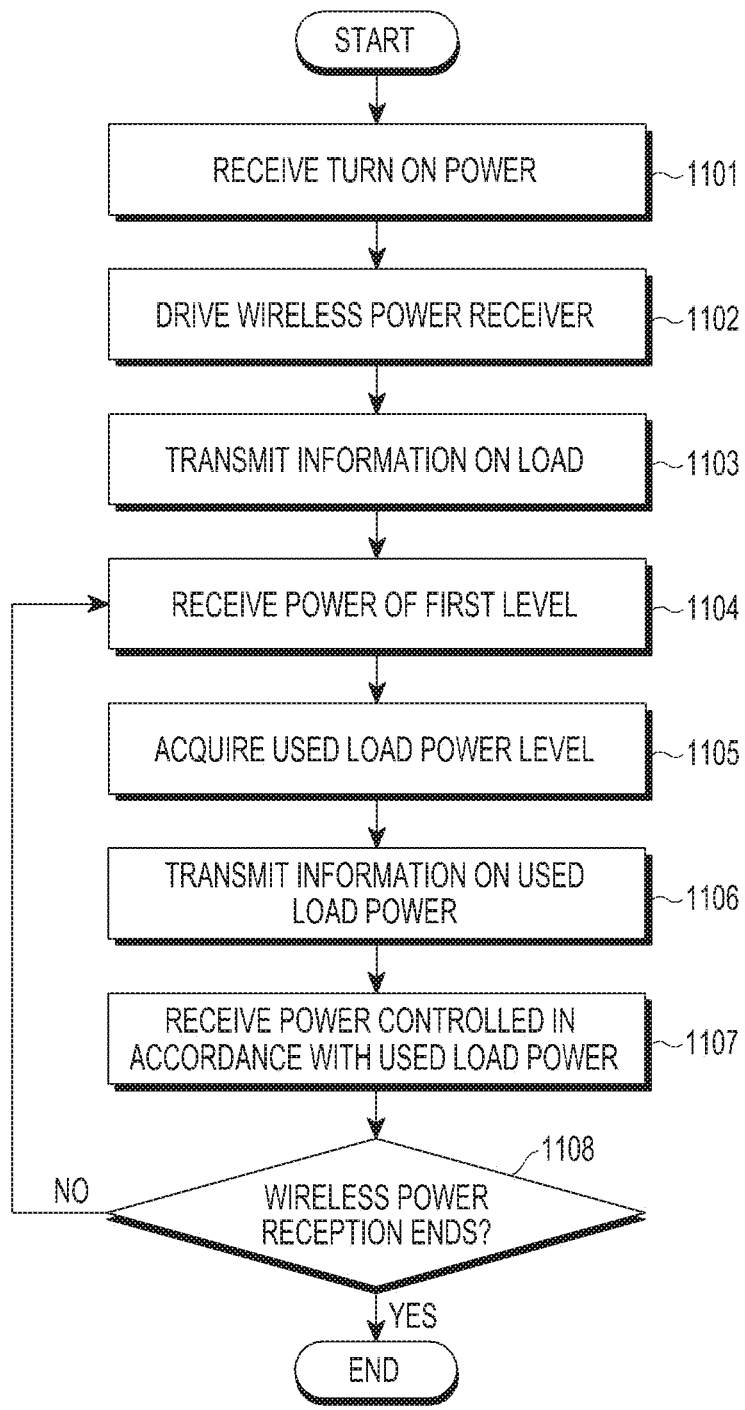
FIG. 11 is a flowchart illustrating a wireless power reception process of a wireless power receiver according to an embodiment of the present disclosure.

FIG. 11 is a flowchart illustrating a wireless power reception process of a wireless power receiver according to an embodiment of the present disclosure.

Referring to FIG. 11, in operation 1101, the wireless power receiver (for example, wireless power receiver 750) may receive turn-on power from the wireless power transmitter (for example, wireless power transmitter 700).

In operation 1102, the wireless power receiver may receive the turn-on power to initiate driving. The wireless power receiver may establish a communication connection with the wireless power transmitter based on the turn-on power.

In operation 1103, the wireless power receiver may transmit information on a load electrically connected to the wireless power receiver. The information may include a capability of the wireless power receiver, for example, a capacity of a capacitor included in the wireless power receiver, and information on a charging/discharging speed of the capacitor. Further, the information on the load may include at least one of a capacity of the load, for example, a maximum load power level of the load, a minimum power level of the load, a rated power level of the load, and a used load power level according to a load change in the load.

In operation 1104, the wireless power receiver may receive power of a first level determined based on a maximum load power level of the load from the wireless power receiver.

In operation 1105, the wireless power receiver may directly supply the received wireless power to the load and acquire information on a load change in the load. The wireless power receiver may detect a voltage value and a current value between the wireless power receiver and the load, and acquire a used load power level, which is power used by the load, by using the detected voltage value and current value.

In operation 1106, the wireless power receiver may transmit information on the acquired used load power level to the wireless power transmitter.

In operation 1107, the wireless power receiver may receive power, which is controlled in accordance with the used load power level, from the wireless power transmitter.

In operation 1108, the wireless power receiver may re-initiate the wireless power reception operation according to whether the wireless power reception operation ends. If the wireless power reception operation does not end in operation 1108, the wireless power receiver returns to operation 1104.

The embodiments disclosed herein can be implemented through at least one software program running on at least one hardware device and performing network management functions to control the elements. The elements include blocks which can be at least one of a hardware device, or a combination of hardware device and software module.

According to various embodiments of the present disclosure, at least part of a device (for example, modules, units or functions thereof) or a method (for example, operations) according to this disclosure, for example, as in a form of a programming module, may be implemented using an instruction stored in non-transitory computer-readable storage media. When at least one processor (for example, the processor 120, and controllers 512, 552, 612 and 652) execute an instruction, it may perform a function corresponding to the instruction.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a compiler. The hardware device may be configured to operate as at least one software module to perform an operation of various embodiments and vice versa.

A module or programming module according to various embodiments of the present disclosure may include at least one of the above-mentioned components, may not include some of the above-mentioned components, or may further include another component. Operations performed by a module, programming module, or other components according to various embodiments of the present disclosure may be executed through a sequential, parallel, repetitive or heuristic method. Additionally, some operations may be executed in a different order or may be omitted, and other operations may be added. Moreover, the embodiments disclosed in this specification are suggested for the description and understanding of technical content, but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of wirelessly transmitting power by a wireless power transmitter, the method comprising:
transmitting, to a wireless power receiver, power of a first level based on first information including a first load power level, wherein the first load power level is allowable to a load of the wireless power receiver;
receiving, from the wireless power receiver, second information including a second load power level according to a change in the load of the wireless power receiver, wherein the second load power level is a power level measured at the load;
controlling a power level according to the second information; and
stopping the transmission of the power of the first level during a predetermined condition in response to the second load power level being less than the first level, wherein the predetermined condition includes a condition under which the load operates by an electric discharge of a capacitor included in the wireless power receiver.

2. The method of claim 1,
wherein the capacitor is included in the wireless power receiver, and
wherein power is directly supplied to the load by an electric discharge of the capacitor.

3. The method of claim 1, further comprising:
transmitting to the wireless power receiver, turn-on power of the wireless power receiver;
receiving the first information from the wireless power receiver driven by the turn-on power; and
determining the power of the first level based on the received first information.

4. The method of claim 3, wherein the power of the first level is determined within a range less than the first load power level and greater than a power level of the turn-on power.

5. The method of claim 3, wherein the power of the first level is determined within a power level range which can be changed by the wireless power transmitter on the basis of the first load power level.

6. The method of claim 5, wherein the power of the first level is determined as a minimum power level of the range.

7. The method of claim 1, wherein the predetermined condition includes a capacity of the capacitor.

8. The method of claim 1, wherein, when the predetermined condition is released, the power of the first level is transmitted.

9. The method of claim 1, further comprising:
transmitting power of a second level corresponding to the second load power level in response to the second load power level being greater than the first level.

10. A method of wirelessly receiving power by a wireless power receiver, the method comprising:
transmitting, to a wireless power transmitter, first information including a first load power level, wherein the first load power level is allowable to a load of the wireless power receiver;
receiving, from the wireless power transmitter, power of a first level determined based on the first information by the wireless power transmitter;
acquiring second information including a second load power level according to a change in the load of the wireless power receiver, wherein the second load power level is a power level measured at the load;
transmitting the second information to the wireless power transmitter; and
receiving power of a power level controlled in accordance with the second information from the wireless power transmitter,
wherein the receiving of the power of the first level is stopped by a control of the wireless power transmitter during a predetermined condition in response to the second load power level being less than the first level, and
wherein the predetermined condition includes a condition under which the load operates by an electric discharge of a capacitor included in the wireless power receiver.

11. The method of claim 10,
wherein the capacitor is included in the wireless power receiver, and
wherein power is directly supplied to the load by an electric discharge of the capacitor.

12. The method of claim 10, further comprising:
receiving turn-on power from the wireless power transmitter; and
transmitting, to the wireless power transmitter, the first information when the wireless power receiver is driven by the turn-on power.

13. The method of claim 10, wherein the acquiring of the second information comprises:
detecting a voltage and current applied to the load; and
acquiring the second load power level based on the detected voltage and current.

14. The method of claim 10, further comprising:
receiving wireless power from the wireless power transmitter;
rectifying the received wireless power into direct current (DC) power; and
outputting the rectified DC power to the load as power of a predetermined voltage level.

15. A wireless power transmitter, comprising:
a communication unit configured to receive first information and second information from a wireless power receiver;
a wireless power transmitting unit configured to transmit wireless power to the wireless power receiver; and
a controller configured to:
transmit, to the wireless power receiver, power of a first level based on the first information including a first load power level, wherein the first load power level is allowable to a load of the wireless power receiver,
receive, from the wireless power receiver, the second information including a second load power level according to a change in the load of the wireless power receiver, wherein the second load power level is a power level measured at the load,
control a power level according to the second information, and
stop the transmission of the power of the first level during a predetermined condition in response to the second load power level being less than the first level,
wherein the predetermined condition includes a condition under which the load operates by an electric discharge of a capacitor included in the wireless power receiver.

16. The wireless power transmitter of claim 15, wherein the controller is further configured to:
transmit, to the wireless power receiver, turn-on power of the wireless power receiver,
receive the first information from the wireless power receiver driven by the turn-on power, and
determine the power of the first level based on the received first information.

17. The wireless power transmitter of claim 16, wherein the controller is further configured to determine the power of the first level within a range less than the first load power level and greater than a power level of the turn-on power.

18. The wireless power transmitter of claim 16, wherein the controller is further configured to determine the power of the first level within a power level range which can be changed by the wireless power transmitter on the basis of the first load power level.

19. The wireless power transmitter of claim 18, wherein the controller is further configured to determine the power of the first level to have a minimum power level of the range.

20. The wireless power transmitter of claim 15, wherein the predetermined condition includes a capacity of the capacitor.

21. The wireless power transmitter of claim 15, wherein, when the predetermined condition is released, the controller is further configured to transmit the power of the first level.

22. The wireless power transmitter of claim 15, wherein the controller is further configured to transmit power of a second level corresponding to the second load power level in response to the second load power level being greater than the first level.

23. A wireless power receiver, comprising:
a communication unit configured to transmit first information and second information to a wireless power transmitter;
a wireless power receiving unit configured to receive wireless power from the wireless power transmitter; and
a controller configured to:
transmit, to the wireless power transmitter, the first information including a first load power level, wherein the first load power level is allowable to a load of the wireless power receiver,
receive, from the wireless power transmitter, power of a first level determined based on the first information by the wireless power transmitter,
acquire the second information including a second load power level according to a change in the load of the wireless power receiver, wherein the second load power level is a power level measured at the load,
transmit the second information to the wireless power transmitter, and
receive power of a power level controlled in accordance with the second information from the wireless power transmitter,
wherein the reception of the power of the first level is stopped by a control of the wireless power transmitter during a predetermined condition in response to the second load power level being less than the first level, and
wherein the predetermined condition includes a condition under which the load operates by an electric discharge of a capacitor included in the wireless power receiver.

24. The wireless power receiver of claim 23,
wherein the capacitor is included in the wireless power receiver, and
wherein power is directly supplied to the load by an electric discharge of the capacitor.

25. The wireless power receiver of claim 23, wherein the controller is further configured to:
receive turn-on power from the wireless power transmitter, and
transmit, to the wireless power transmitter, the first information when the wireless power receiver is driven by the turn-on power.

26. The wireless power receiver of claim 23, wherein the controller is further configured to:
detect a current and voltage applied to the load, and
acquire the second load power level based on the detected current and voltage.

27. The wireless power receiver of claim 23, wherein the controller is further configured to:
receive wireless power from the wireless power transmitter,
rectify the received wireless power into direct current (DC) power, and
output the rectified DC power to the load as power of a predetermined voltage level.

28. A non-transitory computer readable recording medium for storing data relating to computing operations, the computer readable recording medium configured to store at least one instruction that when executed by a processor, configures the processor to:

transmit, to a wireless power receiver, power of a first level based on first information including a first load power level, wherein the first load power level is allowable to a load of the wireless power receiver;

receive, from the wireless power receiver, second information including a second load power level according to a change in the load of the wireless power receiver, wherein the second load power level is a power level measured at the load;

control a power level according to the second information; and stop the transmission of the power of the first level during a predetermined condition in response to the second load power level being less than the first level, wherein the predetermined condition includes a condition under which the load operates by an electric discharge of a capacitor included in the wireless power receiver.

29. A non-transitory computer readable recording medium for storing data relating to computing operations, the computer readable recording medium configured to store at least one instruction that when executed by a processor, configures the processor to:

transmit, to a wireless power transmitter, first information including a first load power level, wherein the first load power level is allowable to a load of a wireless power receiver;

receive, from the wireless power transmitter, power of a first level determined based on the first information by the wireless power transmitter;

acquire second information including a second load power level according to a change in the load of the wireless power receiver, wherein the second load power level is a power level measured at the load;

transmit the second information to the wireless power transmitter; and receive power of a power level controlled in accordance with the second information from the wireless power transmitter, wherein the reception of the power of the first level is stopped by a control of the wireless power transmitter during a predetermined condition in response to the second load power level being less than the first level, and wherein the predetermined condition includes a condition under which the load operates by an electric discharge of a capacitor included in the wireless power receiver.

\* \* \* \* \*